United States Patent [19]

Sugimoto et al.

[11] Patent Number: 4,656,044
[45] Date of Patent: Apr. 7, 1987

[54] SOYBEAN MILK-CONTAINING ALCOHOLIC BEVERAGES

[75] Inventors: Naotsugu Sugimoto, Kyoto; Kazutoshi Torii, Ootsu; Yuka Tanahashi, Ootsu; Hideo Morita, Ootsu; Yuzo Watanabe, Muko; Kohei Yamamoto, Osaka; Teisuke Kainuma, Kyoto, all of Japan

[73] Assignee: Takara Shuzo Co., Ltd., Kyoto, Japan

[21] Appl. No.: 761,396

[22] Filed: Aug. 1, 1985

[30] Foreign Application Priority Data

Aug. 9, 1984 [JP] Japan ............................ 59-165741

[51] Int. Cl.⁴ ........................ C12G 3/00; A23L 1/36
[52] U.S. Cl. .............................. 426/592; 426/330.4; 426/477; 426/598; 426/577
[58] Field of Search ............ 426/583, 584, 592, 42, 426/43, 477, 330.2, 330.4, 519, 580, 598, 573, 629, 634, 577

[56] References Cited

U.S. PATENT DOCUMENTS

| | | | |
|---|---|---|---|
| 3,876,806 | 4/1975 | Hempenius et al. | 426/598 |
| 4,389,425 | 6/1983 | Burr, II | 426/598 |

FOREIGN PATENT DOCUMENTS

| | | | |
|---|---|---|---|
| 32078 | 10/1979 | Japan | 426/592 |
| 49189 | 10/1982 | Japan | 426/598 |
| 208965 | 12/1982 | Japan | 426/598 |
| 162253 | 9/1983 | Japan | 426/598 |
| 183060 | 10/1983 | Japan | 426/598 |

*Primary Examiner*—Raymond N. Jones
*Assistant Examiner*—Carolyn Paden
*Attorney, Agent, or Firm*—Wenderoth, Lind & Ponack

[57] ABSTRACT

Soybean milk-containing alcoholic beverage containing fermented soybean milk, acid soybean milk or a mixture thereof, alcohol and high methoxylpectin. This beverage does not result in formation of precipitates.

2 Claims, No Drawings

SOYBEAN MILK-CONTAINING ALCOHOLIC BEVERAGES

The present invention relates to alcoholic beverages, and more particularly, it relates to soybean milk-containing alcoholic beverages containing a carbon dioxide gas as need arises, and forming no precipitates.

In Japan, brewed spirits such as sake, wine, beer, etc. and distilled spirits such as whisky, brandy, shochu (alcoholic beverages obtained from rice, sweet potato, etc. by saccharification, fermentation and distillation), etc. are common alcoholic beverages, but at the present time, a taste for alcoholic beverages is increasingly being diversified. As one of such example, shochu dashed with various fruit juice bases (e.g. lemon, lime, plum) and soda, generally called "Chu-hai" (shochu/-carbonate mixture), is particularly popular among the younger generation as a refreshing liqueur which can easily be made by blending suited to one's own liking.

Also, trials were made to add protein to alcoholic beverages from the standpoints of nutrition and health, and as a result, proposals of milk liqueur [Japanese Patent Publication No. 1524/1964; Japanese Patent Application Kokai (Laid-open) No. 34034/1980], alcoholic beverages made with egg protein (Japanese Patent Publication No. 1763/1974) and the like were made. All of these drinks are made with animal proteins, and alcohol fermentation is carried out in a state wherein the protein is contained. These drinks, therefore, have a large tendency for the flavor to be too strong, being unsuitable for the younger generation fond of a light image.

On the other hand, soybean milk such as fermented soybean milk (made by lactic acid bacteria), acid soybean milk (soybean milk with acidic substances added such as organic acids and fruit juice), etc. are widely taken for the purpose of nutrition and health as beverages containing vegetable protein in high concentrations or alkaline beverages.

Generally, soybean milk extracted from soybean is a beverage containing vegetable protein in high concentrations and superior in terms of health and nutrition, but because of its peculiar soybean odor unsuitable to taste, fermented soybean milk and acid soybean milk are now widely taken.

But, soybean milk protein has its isoelectric point in a pH region of 4.5 to 4.6, and therefore fermented soybean milk and acid soybean milk, as a matter of course, form the coagulum and precipitate of protein. Formation of precipitates becomes remarkable with access to the isoelectric point. Consequently, the largest target in producing fermented soybean milk and acid soybean milk was to produce homogeneous ones presenting no separation or precipitation of protein, and many methods have been developed for this object. For example, there is a recent report that high methoxylpectin, so far used as a gelling agent for jam, jelly, etc., was used as a protein-stabilizing agent for acid soybean milk [Japanese Patent Application Kokai (Laid-open) No. 183060/1983].

But, a method for preventing these soybean milk products from precipitation in the presence of alcohol has not yet been found.

An object of the present invention is to provide alcoholic beverages which contain vegetable protein desirable for health and nutrition, having a refreshing flavor and producing no precipitates.

The present invention is one relating to soybean milk-containing alcoholic beverages producing no precipitates, and the beverages are characterized in that they contain fermented soybean milk and/or acid soybean milk, drinking alcohol (beverage alcohol or distilled spirits), and high methoxylpectin and as need arises, a carbon dioxide gas. That is, the present invention provides homogeneous and soybean milk-containing alcoholic beverages which are desirable from the standpoints of health and nutrition, have a refreshing flavor and a fashionable appearance and produce no precipitates, by mixing drinking alcohol with fermented soybean milk and/or acid soybean milk belonging to alkaline foods and containing protein in high concentrations, high methoxylpectin acting to prevent protein separation and if necessary, a carbon dioxide gas.

A mixed solution of fermented soybean milk or acid soybean milk with an ethyl alcohol solution has a faster speed of separation and precipitate the soybean milk protein than a dispersion of said milk in water, and the speed becomes faster with an increase in the ethyl alcohol concentration. And, when the ethyl alcohol concentration exceeds a definite value, denaturation of the protein occurs instantaneously to make it impossible to disperse the soybean milk protein in the ethyl alcohol solution.

The present inventors searched for a substance acting to stabilize a homogeneous dispersion liquid of soybean milk protein in ethyl alcohol, and as a result, found that high methoxylpectin is most effective as shown in Table 1.

The high methoxylpectin to be used in the present invention contains about 7–13% by weight of methoxyl groups.

TABLE 1

| Kind | Guar gum | | Carrageenan | | Tamarind seed gum | | Xanthan gum | | High methoxyl-pectin | | Low methoxyl-pectin | | Locust bean gum | |
|---|---|---|---|---|---|---|---|---|---|---|---|---|---|---|
| Trade name | Orno-G1 | | Orno-CW | | Glyloid 3B | | Echo gum | | GENU pectin JMJ* | | Neosoft P3** | | GENU gum RL-200 | |
| Manufacturer's name | Organo Co. | | Organo Co. | | Dainippon Seiyaku Co. | | Dainippon Seiyaku Co. | | Sansho Co. | | Taiyo Kagaku Co. | | Sansho Co. | |
| Concentration (%) (w/v) | 0.1 | 0.3 | 0.1 | 0.3 | 0.1 | 0.3 | 0.1 | 0.3 | 0.1 | 0.3 | 0.1 | 0.3 | 0.1 | 0.3 |
| Degree of separation | ++ | ++ | + | ++ | + | ++ | + | + | ± | − | + | ± | ++ | ++ |

Experiment: Alcohol concentration, 10%; fermented soybean milk containing 4.0% of protein, 3.0%; and sugar, 3%.
Degree of separation:
− no separation
± slight separation
+ clear separation
++ remarkable separation
Methoxyl group content:
*11.26–11.75 wt. %
**4.24–5.88 wt. %

A reason why precipitates are not formed in the acid soybean milk/high methoxylpectin system may be considered as follows: Since high methoxylpectin contains not less than about 7% of methoxyl groups it is negatively charged in the solution; therefore when high methoxylpectin is mixed with positively charged soybean milk protein in proper proportions, a state exists in which the surface of the soybean milk protein is covered with high methoxylpectin, to cause the resulting covered products having negative charges to repel one another.

Ethyl alcohol is very strong in not only protein-denaturing action but also dehydrating action. For example, the amount of sugar necessary to precipitate 0.8% pectinic acid is 60% in weight/volume, while that of ethyl alcohol is 17% in weight/volume. As shown above, ethyl alcohol is said to have the same degree of dehydrating power as that of sugar at about one-third of the amount of sugar. Consequently, in a system comprising fermented soybean milk and/or acid soybean milk and high methoxylpectin, it is possible to attain homogeneous dispersion of soybean milk protein, but at elevated alcohol concentrations, the pectin is dehydrated by ethyl alcohol to form a gel. The gelled pectin will no longer dissolve in the system by any treatment.

As described above, stable dispersion of soybean milk protein in the system comprising fermented soybean milk and/or acid soybean milk as well as high methoxylpectin and ethyl alcohol is never attained until the pectin is prevented from gelation caused by the protein-denaturing and dehydrating action of ethyl alcohol. The present inventors were the first to clarify a region wherein stable dispersion of the pectin is attained. The result is shown in Table 2.

In this specification, the units of %, i.e. weight/volume and volume/volume, are abbreviated as w/v and v/v, respectively.

TABLE 2

| Pectin concentration % (w/v) | Alcohol concentration % (v/v) | | | | | | |
|---|---|---|---|---|---|---|---|
| | 3 | 8 | 12 | 14 | 16 | 18 | 20 |
| 0.08 | ± | + | + | + | + | + | + |
|      | − | − | − | − | − | − | − |
| 0.20 | − | − | ± | + | + | + | + |
|      | − | − | − | − | − | − | − |
| 0.35 | − | − | − | − | + | + | + |
|      | − | − | − | − | − | − | − |
| 0.50 | − | − | − | − | − | ± | + |
|      | − | − | − | − | − | − | + |
| 0.65 | − | − | − | − | − | − | − |
|      | − | − | − | − | − | + | ++ |
| 0.80 | − | − | − | − | − | − | − |
|      | − | − | − | − | + | + | ++ |
| 1.00 | − | − | − | − | − | − | − |
|      | − | − | − | + | + | ++ | ++ |
| 1.20 | − | − | − | − | − | − | − |
|      | − | ± | + | + | + | ++ | ++ |

Test solution: pH, 3.70; contains 3.0% (w/v) of fermented soybean milk and 5.0% (w/v) of sugar.
Evaluation:
  Degree of separation (upper symbol):
    −, no separation; ±, slight separation;
    +, clear separation; ++, remarkable separation.
  Degree of gelation (lower symbol):
    −, no gelation; ±, slight gelation;
    +, clear gelation; ++, remarkable gelation.

The following is known from Table 2: When the ethyl alcohol concentration is not less than 18% (v/v), a stable soybean milk-containing alcohol solution cannot be obtained in any system; when said concentration is 16% (v/v), the desired stable solution can be obtained in only a very narrow high methoxylpectin concentration range of 0.50 to 0.65% (w/v); and with a decrease in the alcohol concentration, the range of high methoxylpectin concentration to give the desired stable solution becomes as wide as 0.08 to 1.20% (w/v). Since, however, the alcoholic beverage of the present invention is intended to have a refreshing flavor, it is preferred that the concentration of high methoxylpectin does not exceed 1.00% (w/v). A homogeneous solution of soybean milk protein is always obtained at ethyl alcohol concentrations less than 3% (v/v), but such solution is not preferred as an alcoholic beverage.

The present invention will be illustrated specifically hereinafter.

As the fermented soybean milk used in the present invention, any of those prepared by lactic fermentation will do. As bacteria for the fermentation, Lactobacillus bulgaricus, Lactobacillus acidophillus, Streptococcus thermophilus, Streptococcus lactis, etc. are used. The fermentation condition desirable in terms of flavor is as follows: Temperature, 35° to 45° C.; time, about 14 to about 30 hours; and acidity obtained by fermentation, 1.2 to 1.8% (w/v) converted to lactic acid basis. For producing acid soybean milk, acid fruit juices (e.g. lemon, plum), citric acid or malic acid, or blends of flavorings having no sourness (e.g. coffee extracts, powdered tea extracts) and acidic seasoning agents, are added to soybean milk. It is also effective to use acid soybean milk together with fermented soybean milk. The amount of fermented soybean milk and/or acid soybean milk depends upon the degree of sourness and the homogeneous stability of the desired soybean milk-containing alcoholic beverage and soybean milk protein, etc. According to the opinion of food panelists, amounts of 1 to 15% (w/v) are preferred in keeping the refreshing of flavor, as shown in Table 3. The same tendency was observed with the amount of acid soybean milk.

TABLE 3

| Fermented soybean milk % (w/v) | Evaluation Sensory evaluation |
|---|---|
| 1 | Somewhat low in soybean milk flavor, but good as a carbon dioxide gas-containing beverage. |
| 3 | Has a refreshing flavor and most suitable as a carbon dioxide gas-containing beverage. |
| 5 | Has a refreshing and rich flavor. |
| 10 | Has a slightly thick taste, but becomes suitable by adding flavorings. |
| 15 | Strong in flavor and suitable as a beverage of healthy image. |
| 20 | Unsuitable because too thick and too rich in taste and poor stability of protein. |

Ethyl alcohol, 10% (v/v); high methoxylpectin, 0.5% (w/v); and sugar/acid ratio was properly regulated with sugar.
Fermented soybean milk: protein, 4.1% (w/v); acidity, 1.5% (w/v) converted to lactic acid basis.

Any of the commercial spirits may be taken as a drinking alcohol, but distilled spirits such as shōchū, vodka, brandy, etc. are preferred to keep the characteristics of fermented soybean milk and acid soybean milk undamaged. As described in Table 3, a carbon dioxide gas is desirable for alcoholic beverages emphasizing the refreshment of flavor by controlling the content of soybean milk. Also, it is a matter of course that the effect intended by the present invention is not damaged at all even though sugars, organic acid salts, vitamins, amino acids and flavoring essences are incorporated in the alcoholic beverage of the present invention as need arises.

The order of addition of these materials is not particularly limited, but it is preferred to adopt one of the following orders: high methoxylpectin is first dispersed in a drinking alcohol of not less than 50% (v/v) in concentration, and after adding water, sugars, acids, flavoring essences, etc., fermented soybean milk is finally added; or high methoxylpectin is first dispersed in the sugar solution, and after adding water, acids, flavoring essences and fermented soybean milk, drinking alcohol is finally added. In short, it is sufficient to pay attention so as to avoid direct contact between the protein of fermented soybean milk or acid soybean milk and a high-concentration alcohol, and the gelation of high methoxylpectin by alcohol. Also, by homogenizing these mixed solutions by applying a pressure of about 120 to 150 kg/cm$^2$, a protein-stabilizing effect becomes strong. Also, final addition will suffice for a carbon dioxide gas. The effect of a carbon dioxide gas is particularly good when the amount of fermented soybean milk or acid soybean milk is not so large. The amount of the gas depends upon the kinds and amounts of fermented soybean milk, acid soybean milk, sweetenings (e.g. sugar, starch syrup), flavoring essences, etc., but generally, a preferred carbon dioxide gas pressure is 1.3 kg/cm$^2$ to 3.7 kg/cm$^2$ at 20° C.

The present invention will be illustrated more specifically with reference to the following examples, but it is not limited to these examples.

EXAMPLE 1

Three grams of high methoxylpectin and 60 g of sugar were mixed with 490 ml of water with stirring and dissolved by heating to 65° C. for 10 minutes. After cooling, to this solution were added 90 g of acid soybean milk containing 8 g of a 5-fold lemon juice concentrate (produced by Ogawa Koryo Co.), 200 ml of a commercial 35% alcohol Kō-rui shōchū ("Jun" produced by Takara Shuzo Co.) and 0.4 ml of a lemon-like flavor (produced by Hasegawa Koryo Co.) and the mixture was homogeneously dispersed with stirring.

The resulting acid soybean milk-containing alcoholic beverage was homogeneous without formation of precipitates and had a rich flavor.

EXAMPLE 2

Three grams of high methoxylpectin was dispersed with stirring in 44 ml of 95.5% beverage alcohol, and to this solution were added 167 ml of water, 40 g of sugar, 30 g of commercial fermented soybean milk (produced by Marusanai Co.) and 1 g of yogurt-like flavor (produced by Hasegawa Koryo Co.). After homogeneous dispersion, 750 ml of soda was added and bottling was carried out.

The product was an alcoholic beverage separating little protein and having a refreshing flavor.

EXAMPLE 3

65 Grams of sugar and 70 g of starch syrup [solid content, 75% (w/w) produced by Matsutani Kagaku Co.] were dissolved in 300 ml of water, and 10 g of high methoxylpectin was added and dispersed therein with stirring. To this solution were added 180 g of fermented soybean milk and 200 g of water, and after mixing, 450 ml of a commercial vodka [alcohol content, 45% (v/v)] was finally added thereto. The mixture was emulsified and homogenized on a homogenizer (HC3-2, Sanmaru Kikai Kōgyō Co.) under a pressure of 150 kg/cm$^2$ to obtain a fermented soybean milk-containing alcoholic beverage rich in a vodka flavor.

This product was also a beverage superior in stability presenting little separation and precipitation.

As illustrated in detail hereinabove, the soybean milk-containing alcoholic beverage of the present invention is a novel beverage which is superior in terms of health and nutrition, produces no protein precipitates and has a refreshing flavor.

What is claimed is:

1. A soybean milk-containing alcoholic beverage producing no precipitates, wherein said beverage contains (1) 1 to 15% (w/v) of at least one soybean milk product selected from the group consisting of fermented soybean milk and acid soybean milk, (2) 3 to 16% (v/v), as alcohol, of drinking alcohol and (3) 0.08 to 1.00% (w/v) of high methoxylpectin.

2. A beverage as claimed in claim 1, which further contains a carbon dioxide gas.

* * * * *